March 25, 1969    W. E. SWIFT    3,435,221
BAROMETRIC COMPENSATION FOR GAUGING APPARATUS
Filed Feb. 10, 1966

INVENTOR.
W. EVERETT SWIFT
BY David E. Hopper
ATTORNEY

United States Patent Office 3,435,221
Patented Mar. 25, 1969

3,435,221
BAROMETRIC COMPENSATION FOR GAUGING APPARATUS
Willard Everett Swift, Sharon, Mass., assignor to The Foxboro Company, Foxboro, Mass., a corporation of Massachusetts
Filed Feb. 10, 1966, Ser. No. 526,585
Int. Cl. G01t 1/16
U.S. Cl. 250—83.3      3 Claims

ABSTRACT OF THE DISCLOSURE

Appearing for barometric compensation of beta gauges employs means for sensing the barometirc pressure in the general region of the beta gauge coupled to means for providing a compensatory electrical signal; the compensatory electrical signal, which is related to the barometric pressure, is employed to qualify the electrical signal output of the beta gauge receiver in a manner to cancel error appearing therein as a consequence of barometric pressure change.

---

Figure 1:
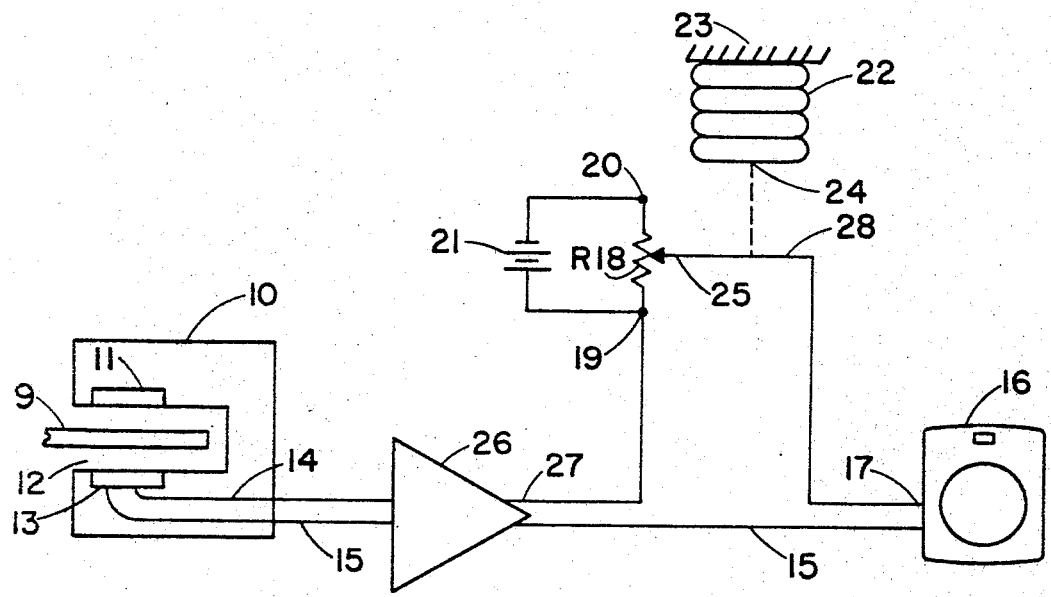

This invention relates to barometric compensators and, more specifically, to barometric compensation of beta gauges.

Beta gauges are commonly used to monitor the weight per unit area of sheet materials. Sheet material is continuously run through a gap in the gauge head. Beta emission from one side of this gap is effectively measured by means of an ionization chamber on the other side of the gap. The measurement by the ionization chamber provides an indication of the amount of beta emission absorbed by the intervening sheet material in the gap.

Weight per unit area is frequently referred to as basis weight especially in the paper industry. Basis weight of a paper sample is the weight of a specified area of that paper.

One common weight basis is pounds per 500-sheet ream of paper cut 24″ x 36″. This would commonly be written as "pounds basis weight 24 x 36–500". An alternative way of expressing the same weight basis would be "pounds per 3000 square feet," i.e., 2 ft. x 3 ft. x 500. A number of other weight bases are used in the paper industry, such as 17 x 22–500, 25 x 38–480, pounds per 1000 square feet and grams per square meter. Still other weight bases are used by other industries, such as ounces per square yard in textiles, and milligrams per square centimeter, commonly used in nuclear industry.

In actual practice, the basis weight is usually determined by weighing a sample of known size on a special scale calibrated to read directly in the desired units. For instance, a one-foot square sample, weighted on a properly calibrated scale, might read in pounds basic weight 24 x 36–500.

In the measuring head of a beta gauge, the beta rays emitted by the radioactive source placed on one side of a measuring gap are detected and quantitatively measured by an ion chamber placed so as to receive the beta rays on the other side of the measuring gap. Any material, such as a sheet of paper placed in the measuring gap, will attenuate the amount of beta rays reaching the ion chamber detector. The material in the gap, in this case paper, absorbs and scatters the incident beta rays in a known relationship to the weight per unit area of the material being measured. The ion chamber detector is connected to a suitable amplifier, the output of which provides a signal indicating an accurate measurement of the basis weight of the material.

Beta rays are absorbed and scattered by any material present in the space between the source and the detector; thus the air present in the measuring gap is weighed along with the paper or other sheet material placed therein. The amount of air present in the fixed measuring gap commonly provided in beta gauges varies significantly in inverse proportion to absolute temperature and in proportion to barometric pressure. Variations in the amount of air in the measuring gap cause changes in the gauge reading and constitute errors in the apparent weight of the sheet material. Air temperature may be conveniently compensated for by a temperature sensor positioned at the measuring head. The output of the temperature sensor may be fed into the measuring system as a temperature compensation for such system, as shown in U.S. Patent to Swift, No. 2,919,351.

In a 1.5-inch air space between beta emission source and ionization chamber in a beta gauge measuring head, a 1-inch mercury change in barometric pressure will operate to change the basis weight reading by about 1.9 lbs. on a 3000 sq. ft. basis. That is to say, the beta emission absorption in the air gap is affected by barometric changes to the extent of shifting the zero output of the ionization chamber by 1.9 lbs. basis weight for each 1-inch mercury change. Several means have been employed to compensate for variations in barometric pressure in beta gauges, such as by varying the amount of ionizable gas in the ionization chamber in the measuring head by means of expansion and contraction of the bellows, as shown in U.S. Patent to Swift, No 2,884,537. This means can compensate accurately only over a relatively narrow basis weight range. Another means of compensation is similar except that a bellows is applied to a gaseous beta emitting source, as shown in the same patent, but has similar limitations. Briefly stated, the present invention proposes a method of barometric compensation of a beta gauge which modifies the effective electrical output of the ionization chamber of a beta gauge in accordance with the variations in barometric pressure. This may be accomplished by inserting a variable electrical signal responsive to changes in barometric pressure in series with the electrical output of the beta gauge amplifier, thereby cancelling shifts in the output of the ionization chamber detector resulting from barometric variations.

Accordingly, it is an object of this invention to provide barometric pressure compensation means for beta gauge measuring apparatus which is simple and efficient, and has an adequate range of barometric pressure compensation to cover expected changes.

It is another object of this invention to provide barometric pressure compensation means for beta gauge measuring apparatus so that the measurement output of the gauge will be an accurate representation of the weight per unit area of the material under examination regardless of atmospheric pressure conditions.

It is another object of this invention to provide a barometric compensation means in conjunction with the electrical output of a beta gauge measuring apparatus to correct within acceptable tolerances the zero shift of that output, occasioned by barometric pressure changes.

Figure 2:
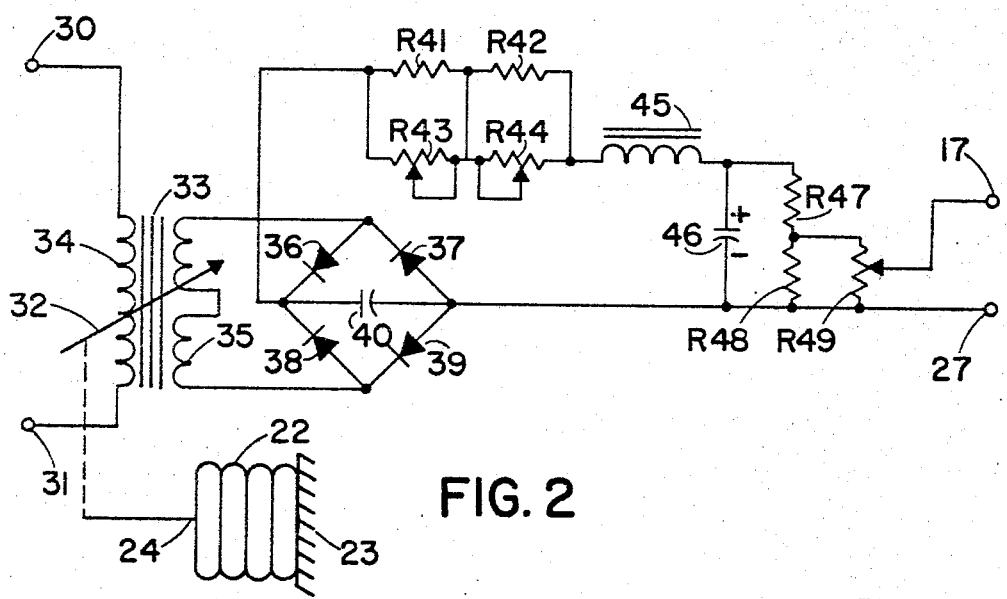

These and other objects and advantages of this invention will be in part apparent from the following specifications taken in conjunction with the several figures therewith, in which:

FIGURE 1 is a block diagram of a beta gauge system, incorporating barometric compensation; and FIGURE 2 is a schematic of a barometric compensator circuit for insertion in the electrical output of a beta gauge.

Referring now to FIGURE 1, gauge frame 10 contains beta radiation source 11 and ionization chamber 13, both mounted therewith and opposing one another across intervening air gap 12. Ionization chamber 13 produces an electrical current at its output 14 which is proportional to the amount of beta radiation reaching chamber 13 from across air gap 12. Within air gap 12, material 9 is inserted for weight testing; material 9 may conveniently be a sheet running continuously through air gap 12. Signal output 14 of ionization chamber 13 is amplified by amplifier 26. Amplifier 26 is a high current gain amplifier, capable of converting the current from ionization chamber 14 into a proportionate electrical potential at its output 27. Thereby, output 27 of amplifier 26 is a continuously indicating measurement of the instantaneous basis weight of material 9, which is running in sheet form through air gap 12.

Ground wire 15 interconnects the signal between terminals of ionization chamber 13, amplifier 26, and high impedance voltmeter 16. Voltmeter 16 illustratively has a recording facility to provide a record of the material basis weight.

Inserted in series between signal output 27 of amplifier 26 and signal input 17 of high impedance voltmeter 16 is an electric potential obtained from battery 21 and tapped off by potentiometer R18. Battery 21 is connected to terminals 19 and 20 which are at either end of potentiometer R18, providing its voltage thereto. Terminal 19 is connected to output 27 and movable contact 25 of potentiometer R18 is connected to input 17 of high impedance voltmeter 16. Sealed bellows 22 is fixedly mounted at one end thereof to fixed point 23, and is mechanically linked at its other end 24 to positioner 28, actuating movable contact 25 of potentiometer R18.

Sealed bellows 22 conveniently has a range of operation over a change of 6 inches of mercury barometric pressure. This range may be conveniently from 26 inches of mercury to 32 inches of mercury, to cover any expected barometric pressure likely to occur throughout the seasons of the year. Bellows 22 may be located anywhere in the general vicinity of the beta gauge apparatus, as it may be assumed the barometric pressure is similar throughout the general vicinity.

In practice, the voltage of battery 21 should be equal to the change in voltage at the output 27 of amplifier 26 resulting from any expected variation in barometric pressure. Typically, this may amount to about 20 millivolts. Changes in barometric pressure cause expansion or contraction of bellows 22 which, through positioner 28, varies the position of moving potentiometer contact 25, thereby varying the voltage injected between output 27 of amplifier 26 and input 17 of voltmeter 16. The voltage tapped by movable contact 25 of potentiometer 18 produces a range at output voltages equal to the variation in the output of amplifier 26 due to the changes in barometric pressure.

When movable contact 25 of potentiometer 18 is run all the way towards terminal 19 of potentiometer 18, the injected voltage between output 27 and input 17 is reduced to zero. The gauge system can be adjusted for a zero reading of basis weight with an empty air gap 12 at the atmospheric pressure actuating movable contact 25 to this zero-producing position. With battery 21 connected with the proper polarity deviations in barometric pressure from this condition produce an injected voltage from potentiometer 18 equal and opposite to the error voltage appearing at output 27, thereby cancelling it and giving a zero reading at all atmospheric pressures with an empty air gap 12.

Referring now to FIGURE 2, a schematic diagram of a second type of barometric compensator circuit is shown. This circuit is the functional equivalent of the combination of bellows 22, battery 21 and potentiometer R18 of FIGURE 1, but has improved characteristics for practical applications, in that the mechanical actuation force required by bellows 22 is reduced to a minimum, thus reducing dead space in the compensation caused by friction, backlash and mechanical instabilities.

Bellows 22, mounted at one end to fixed point 23 and movably operable at other end 24, is connected from end 24 to movable slug 32 of variable-reluctance differential transformer 33; this slug may be oriented to vary the amount of electrical transfer from primary winding 34 to secondary winding 35. An input of 117 volts A-C, 60 cycles, is applied between terminals 30 and 31, connected to primary 34 of transformer 33. The signal at the secondary of transformer 33 has a frequency of 60 cycles and a maximum voltage at maximum coupling position of core 32 of, illustratively, 4 volts. The signal from secondary 35 is coupled to a diode full-wave rectifying bridge, consisting of diodes 36, 37, 38 and 39. This diode bridge full-wave rectifies the 60-cycle signal from transformer 33 to a single-polarity signal, which is filtered by capacitor 40 to a D-C signal, having an amplitude proportional to the amplitude of the A-C signal appearing at the secondary of transformer 33. The rectified signal from the diode bridge is coupled through a resistance network consisting of R41, R42, R43, and R44, to choke 45. The negative terminal is coupled from the diode bridge to terminal 27. Capacitor 46 at the output of choke 45 further filters the rectified D-C signal to remove any pulsating component of current therein. Voltage divider, R47 and R48, across capacitor 46 taps off a proportionate amount of the rectified and filtered D-C signal for connection across potentiometer R49. The adjustable contact of R49 is connected to terminal 17. Potentiometer R49 is adjusted so that at maximum error, that is to say maximum coupling at transformer 33, the voltage injected between terminals 17 and 27 as shown in FIGURE 1 and FIGURE 2 compensates for the error produced by the barometric pressure as already described. Thus R48 is a span adjustment, matching the magnitude of the generated correction signal to the magnitude of the error signal from output 27. If it can be assumed the span adjustment is correct, the indicating voltmeter 16 can be adjusted to zero reading with an empty air gap at the barometric pressure happening to be prevailing; barometric pressures will produce a greater or lesser error signal which will be cancelled by an equal injected correction signal between terminals 27 and 17.

While there has been shown what is considered to be a preferred embodiment of the invention, it will be manifest that many changes and modifications may be made therein without departing from the essential spirit of the invention. It is intended, therefore, in the annexed claims to cover all such changes and modifications as fall within the true scope of the invention.

What is claimed is:

1. A barometric compensator for a beta gauge system comprising means responsive to barometric pressure having an output related thereto, a circuit responsive to said means having an output therefrom providing an electrical signal related to said barometric pressure adapted for modifying the beta gauge measurement signal in a manner to cancel errors in the beta gauge measurement signal resulting from variations in barometric pressure, and an amplifier responsive to the output of the beta gauge ionization chamber wherein said electrical signal is inserted in series between the output of said amplifier and the input of a device for indicating the beta gauge measurement.

2. The barometric compensator of claim 1 wherein said means responsive to barometric pressure is a pressure-responsive sealed bellows having a mechanical output therefrom and said circuit includes a variable-reluctance transformer having a movable component in its magnetic field actuated by said mechanical output of said bellows.

3. The barometric compensator of claim 2 in combination with a beta gauge system.

(References on following page)

References Cited

UNITED STATES PATENTS

| | | | |
|---|---|---|---|
| 2,011,315 | 8/1935 | Gilbert | 324—99 |
| 2,347,200 | 4/1944 | Lehde | 324—99 X |
| 2,800,591 | 7/1957 | Gilman | 250—83.30 |
| 2,883,555 | 4/1959 | London | 250—105 |
| 2,919,351 | 12/1959 | Swift | 250—83.30 |
| 3,060,313 | 10/1962 | Ohmart et al. | 250—43.5 |
| 3,148,278 | 9/1964 | Schonborn et al. | 250—83.30 |
| 3,248,545 | 4/1966 | Hansen | 250—83.30 |

RALPH G. NILSON, *Primary Examiner.*

SAUL ELBAUM, *Assistant Examiner.*

U.S. Cl. X.R.

324—99